United States Patent
Simpson, Jr. et al.

(10) Patent No.: US 7,853,590 B2
(45) Date of Patent: Dec. 14, 2010

(54) REMOTE READ-WRITE ACCESS TO DISPARATE DATA STORES

(75) Inventors: Russell L. Simpson, Jr., Kirkland, WA (US); James R. Van Eaton, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 327 days.

(21) Appl. No.: 11/293,698

(22) Filed: Dec. 2, 2005

(65) Prior Publication Data
US 2007/0130108 A1 Jun. 7, 2007

(51) Int. Cl.
*G06F 17/30* (2006.01)
(52) U.S. Cl. ............................. 707/736; 707/770
(58) Field of Classification Search ............... None
See application file for complete search history.

(56) References Cited

U.S. PATENT DOCUMENTS

| | | | |
|---|---|---|---|
| 5,115,501 A | 5/1992 | Kerr | |
| 5,634,053 A * | 5/1997 | Noble et al. | 707/4 |
| 6,016,478 A * | 1/2000 | Zhang et al. | 705/9 |
| 6,023,694 A * | 2/2000 | Kouchi et al. | 707/2 |
| 6,292,803 B1 * | 9/2001 | Richardson et al. | 707/102 |
| 6,295,541 B1 * | 9/2001 | Bodnar et al. | 707/203 |
| 6,366,915 B1 * | 4/2002 | Rubert et al. | 707/10 |
| 6,505,200 B1 | 1/2003 | Ims et al. | |
| 6,516,344 B1 | 2/2003 | Nazari | |
| 6,574,639 B2 * | 6/2003 | Carey et al. | 707/104.1 |
| 6,591,277 B2 * | 7/2003 | Spence et al. | 707/103 R |
| 6,625,617 B2 * | 9/2003 | Yarnall et al. | 707/104.1 |
| 6,738,077 B1 | 5/2004 | Wendker et al. | |
| 6,823,373 B1 * | 11/2004 | Pancha et al. | 709/219 |
| 6,854,016 B1 | 2/2005 | Kraenzel et al. | |
| 6,882,659 B1 * | 4/2005 | Novak et al. | 370/466 |
| 6,934,697 B1 | 8/2005 | Warren | |
| 6,957,219 B1 | 10/2005 | Lin et al. | |
| 6,985,905 B2 * | 1/2006 | Prompt et al. | 707/102 |
| 7,113,964 B1 * | 9/2006 | Bequet et al. | 707/204 |
| 7,231,433 B1 * | 6/2007 | Hellbusch et al. | 709/219 |
| 7,315,903 B1 * | 1/2008 | Bowden | 709/250 |
| 7,353,234 B2 | 4/2008 | Kimball et al. | |

(Continued)

FOREIGN PATENT DOCUMENTS

EP 1122672 A2 8/2001

(Continued)

OTHER PUBLICATIONS

Mahmoud, "Getting Started with the PIM APIs," Technical Topics, Feb. 2005, 9 pages, Sun Microsystems, Inc., U.S.A.

(Continued)

*Primary Examiner*—Neveen Abel Jalil
*Assistant Examiner*—Jacques Veillard
(74) *Attorney, Agent, or Firm*—Senniger Powers LLP

(57) ABSTRACT

Providing a rich user experience on a network client in which personal information management (PIM) data from a plurality of data sources is aggregated and displayed to the user. An aggregation system connects to data sources and maps attributes of PIM data in the data sources to a common object model. An object of aggregated PIM data is created according to the mapped attributes. The aggregation system generates user interface data representing the created object and sends the user interface data to the network client for rendering.

13 Claims, 2 Drawing Sheets

U.S. PATENT DOCUMENTS

| | | | |
|---|---|---|---|
| 7,412,457 B2 * | 8/2008 | Saracco et al. | 707/103 Y |
| 7,447,745 B2 * | 11/2008 | Lehavi | 709/206 |
| 7,587,501 B2 * | 9/2009 | Stillion et al. | 709/229 |
| 2001/0049613 A1 * | 12/2001 | Gramann et al. | 705/5 |
| 2002/0059425 A1 | 5/2002 | Belfiore et al. | |
| 2002/0083120 A1 | 6/2002 | Soltis | |
| 2002/0129331 A1 | 9/2002 | Zhang et al. | |
| 2002/0143876 A1 * | 10/2002 | Boyer et al. | 709/205 |
| 2002/0178225 A1 * | 11/2002 | Madenberg et al. | 709/206 |
| 2003/0014421 A1 | 1/2003 | Jung | |
| 2003/0065742 A1 * | 4/2003 | Culp et al. | 709/218 |
| 2003/0140177 A1 | 7/2003 | Arajs et al. | |
| 2003/0163479 A1 | 8/2003 | Mathews et al. | |
| 2003/0191761 A1 | 10/2003 | Bauer | |
| 2004/0001081 A1 | 1/2004 | Marsh | |
| 2004/0117482 A1 | 6/2004 | Salazar | |
| 2004/0193731 A1 | 9/2004 | Mitchell | |
| 2004/0236749 A1 | 11/2004 | Cortright et al. | |
| 2005/0015663 A1 | 1/2005 | Armangau et al. | |
| 2005/0050068 A1 | 3/2005 | Vaschillo et al. | |
| 2005/0080948 A1 | 4/2005 | Rowlands | |
| 2005/0172261 A1 | 8/2005 | Yuknewicz et al. | |
| 2005/0235258 A1 | 10/2005 | Wason | |
| 2009/0083314 A1 * | 3/2009 | Maim | 707/103 R |

FOREIGN PATENT DOCUMENTS

| | | | |
|---|---|---|---|
| WO | WO00/67105 | * | 11/2000 |
| WO | 0198933 A1 | | 12/2001 |

OTHER PUBLICATIONS

Hacklin, "A 3G Convergence Strategy for Mobile Business Middleware Solutions," Master's Thesis, Sep. 2001, 183 pages, Royal Institute of Technology, Sweden.

Unknown, "BlackBerry Software," Enterprise Software, 2005, 1 page, Research in Motion Limited, U.S.A.

Amer-Yahia et al., A Comprehensive Solution to the XML to Relational Mapping Problem, Proceedings of the 6th Annual ACM International Workshop on Web Information and Data Management, 2004, pp. 31-38, retrieved on Jun. 17, 2010, from http://protal.acm.org/citation.cfm?id=1031453.1031461.

Elmasri et al., Conceptual Modeling for Customized XML Schemas, Conceptual Modeling—ER 2002, pp. 429-443, retrieved on Jun. 17, 2010, from http://www.springerlink.com/content/ry46wmun9xmy11rn/fulltext.pdf.

* cited by examiner

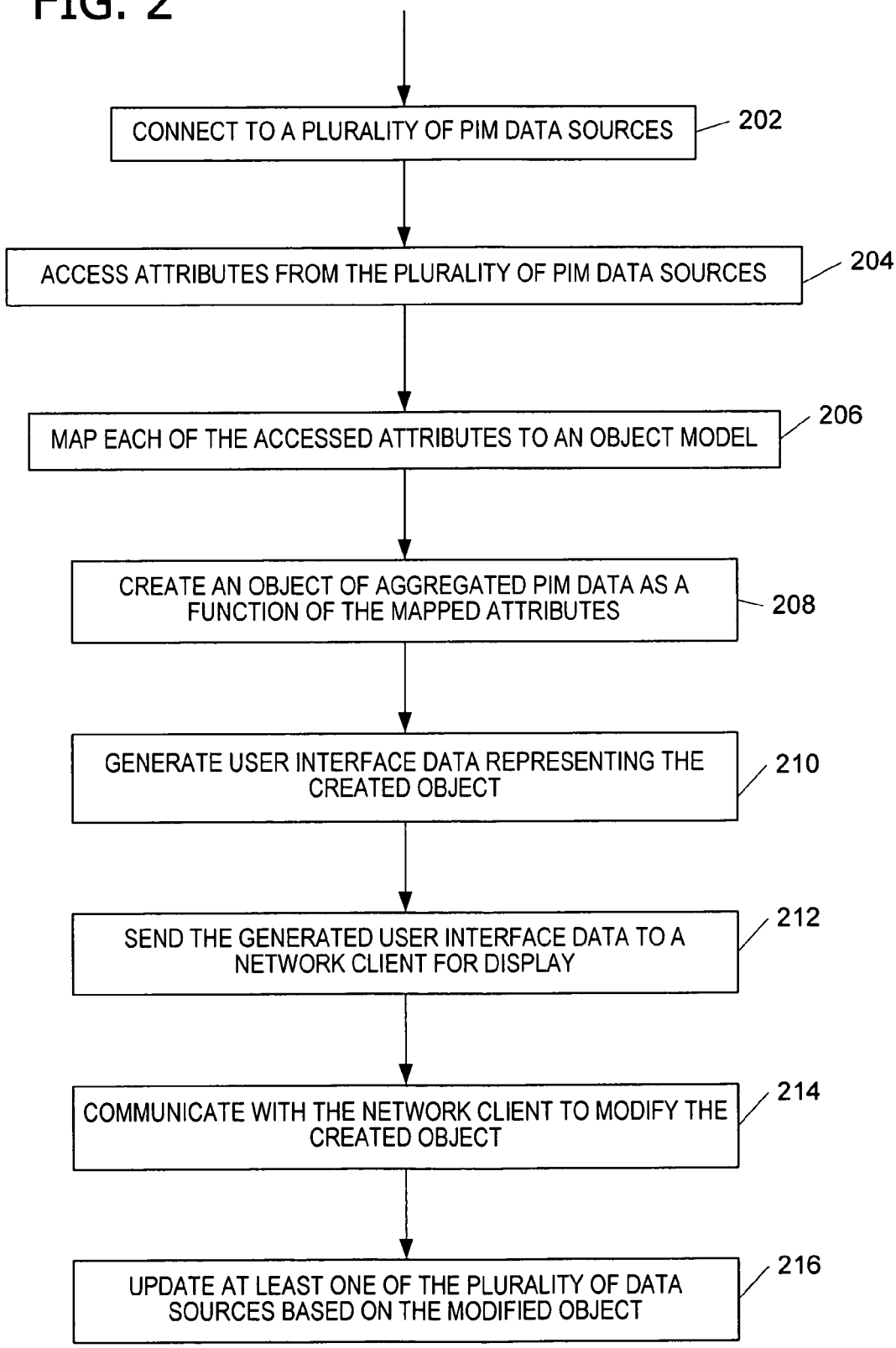

REMOTE READ-WRITE ACCESS TO DISPARATE DATA STORES

BACKGROUND

An enterprise network includes computing devices in a network or series of networks. Users access stored data within the enterprise network via the computing devices including, for example, client desktop machines, portable digital assistants, mobile telephones, wireless devices, and the like. When a user is connected to the enterprise network from a client desktop machine, the user often has access to personal information management (PIM) data stored in disparate server and desktop systems throughout that network. PIM data typically includes contact data (e.g., names, telephone numbers, and email addresses of contacts), a task list, notes, and other information useful to the user. The user reads and writes PIM data, for example, via client application programs. In one example, a user of the Outlook brand messaging and collaboration client from Microsoft Corporation of Redmond, Washington on an enterprise desktop can access a local personal store file (e.g., a .PST file) and PIM data stored on an Exchange mail server from Microsoft Corporation and copy data between the two data sources in a single user interface.

When accessing PIM data from a network client (e.g., a web browser), however, the user has limited access to network resources and limited functionality. In particular, the user is limited to opening separate sessions or connections to access data stored in separate data stores. For example, the user may have access to electronic mail, but the user interface will not display PIM data integrated from other data sources with the electronic mail. In general, there is a lack of integration or aggregation among disparate data stores in the enterprise network for network clients.

SUMMARY

Embodiments of the invention include an architecture for providing a rich experience for users of network clients when accessing personal information management (PIM) data. In an embodiment, the invention includes a schema that maps attributes or properties of objects from disparate data sources into a common object model. Aspects of the invention create aggregated PIM data as a function of the attributes mapped via the schema. The architecture further provides for the generation and transmission of user interface data representing the aggregated PIM data to the network client for display to the user. The user interacts with the aggregated PIM data as if the aggregated PIM data were from a single data source.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 2 is an exemplary flow chart illustrating operation of the aggregation server of FIG. 1.

Corresponding reference characters indicate corresponding parts throughout the drawings.

DETAILED DESCRIPTION

Figure 1:
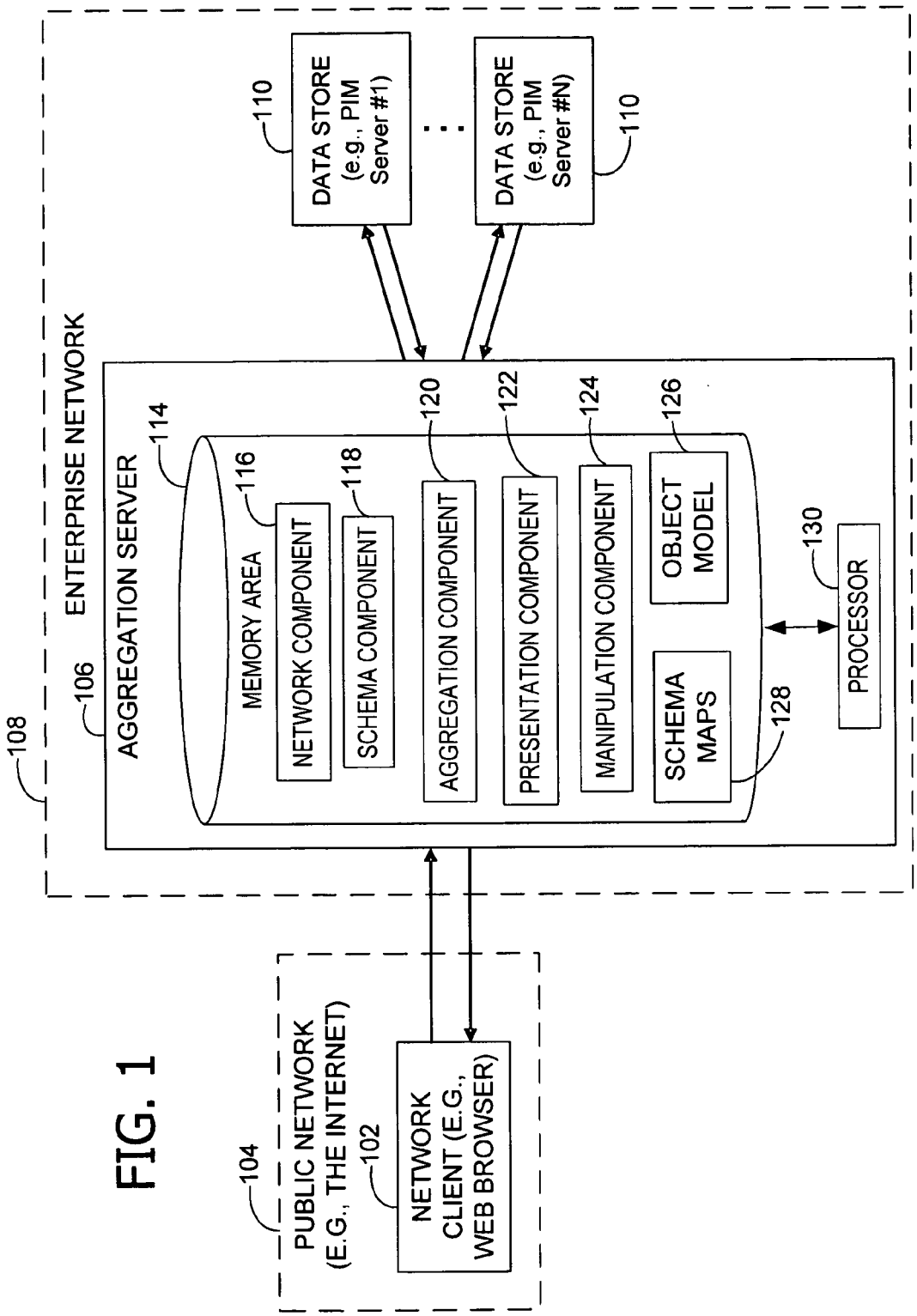
FIG. 1 is an exemplary block diagram illustrating a network client interacting with an aggregation server accessing disparate data stores.

Referring first to FIG. 1, an exemplary block diagram illustrates a network client 102 within a public network 104 such as the Internet interacting with an aggregation server 106 in an enterprise network 108 accessing disparate data stores 110. The network client 102 includes a server deployed client experience such as to a web browser or the like. In one embodiment, the network client 102 comprises one or more of the following: a computing device, an application program, a personal digital assistant, a wireless device, a telephone, and a laptop computer. The network client 102 communicates with the aggregation server 106 in the enterprise network 108. The enterprise network 108 includes the data stores 110 such as personal information management (PIM) data servers, desktop machines, computing devices, or other data sources. In the embodiment of FIG. 1, the data stores 110 include PIM server #1 through PIM server #N. One or more protocols may be used for communications between the aggregation server 106 and the data sources. PIM data includes, but is not limited to, calendar data, contacts data, task data, documents, electronic mail, and the like.

In one embodiment, the aggregation server 106 includes a memory area 114 and a processor 130. In general, the aggregation server 106 seamlessly integrates, aggregates, co-mingles, merges, or otherwise combines the data. The memory area 114 includes one or more computer-executable components such as a network component 116, a schema component 118, an aggregation component 120, a presentation component 122, and a manipulation component 124. The processor 130 executes the computer-executable components 116, 118, 120, 122, 124. The network component 116 connects to the plurality of data sources. For example, the network component 116 binds to a mailbox object. The data sources represent PIM data according to various data models or schemas. The schema component 118 maps attributes from the schemas of the plurality of data sources to a common object model 126 (e.g., via one or more schema maps 128). The object model 126 has a plurality of object model attributes corresponding to PIM data. Each of the schema maps 128 correlates the plurality of object model attributes to data source attributes associated with each of the data sources. The schema maps 128 for each of the data stores 110 may be hard-coded in one implementation, but extensible in other implementations via text-based configuration files to facilitate, for example, the addition of a disparate data source. The common object model 126 abstracts any differences in the data models or schemas of each of the data sources.

The aggregation component 120 creates an object of aggregated PIM data as a function of the attributes mapped by the schema component 118. The presentation component 122 generates user interface data representing the object created by the aggregation component 120. The generated user interface data includes, but is not limited to, one or more of the following: hypertext markup language data, presentation data, extensible markup language data, and the like. The network component 116 sends the user interface data generated by the presentation component 122 to the network client 102 for display. In one example, the generated user interface data represents a single view of calendar data merged from a plurality of data sources.

The manipulation component 124 updates the created object responsive to user input on the network client 102. The manipulation component 124 further identifies and updates at least one of the data sources associated with the user input. While the invention includes a plurality of aggregation servers 106 in one embodiment (not shown), single aggregation server embodiments of the invention employ less hardware than typical systems.

The exemplary operating environment illustrated in FIG. 1 includes a general purpose computing device (e.g., network client 102) such as a computer executing computer-executable instructions. The computing device typically has at least some form of computer readable media (e.g., memory area 114). Computer readable media, which include both volatile and nonvolatile media, removable and non-removable media, may be any available medium that may be accessed by the general purpose computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The computing device includes or has access to computer storage media in the form of removable and/or non-removable, volatile and/or nonvolatile memory. The computing device may operate in a networked environment using logical connections to one or more remote computers.

Although described in connection with an exemplary computing system environment, aspects of the invention are operational with numerous other general purpose or special purpose computing system environments or configurations. The computing system environment is not intended to suggest any limitation as to the scope of use or functionality of aspects of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other computing devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

Referring next to FIG. 2, an exemplary flow chart illustrates operation of the aggregation server 106 of FIG. 1. Computer-executable instructions operate to connect the aggregation server 106 to a plurality of data sources at 202 each providing attributes corresponding to PIM data, access the attributes from the plurality of data sources at 204, map each of the accessed attributes to an object model (e.g., object model 126 in FIG. 1) at 206, and create an object of aggregated PIM data as a function of the mapped attributes at 208. The instructions further operate to generate user interface data representing the created object at 210 and send the generated user interface data to the network client 102 for display at 212. The network client 102 renders the object or the array of objects in the generated user interface data regardless of the source or origin of the object(s).

In one embodiment, the user communicates with the aggregation server 106 via the network client 102 to modify the created object at 214. The aggregation server 106 updates at least one of the plurality of data sources based on the modified object (e.g., update the data source with the user's modification) at 216. For example, the user may perform a drag-and-drop operation on the network client 102, wherein the drag-and-drop operation is between two different data stores.

In one embodiment, one or more computer-readable media have computer-executable instructions for performing the computerized method illustrated in the figures.

Embodiments of the invention enable the user to view "like" data in the client user interface in a common and consistent fashion regardless of from where the data is sourced. For example, if the user views calendar events for "today" that are stored in a team calendar in one data source and then views the calendar events for "today" that are stored in a personal mailbox in another data store, the two views look identical and the user interacts with these two views in the same way. In another embodiment, the invention also aggregates the data to generate a single view of "today" with events from both sources being merged. In yet another embodiment, the two event collections may also be viewed "side-by-side."

In one embodiment, the view in the user interface may be either aggregated (e.g., calendar items from one calendar are merged with calendar items from another calendar into a single "Daily" view for a given day) or displayed side-by-side. In a side-by-side view example, two "Daily" calendar views are displayed side-by-side (e.g., one with personal appointments and one with team appointments). In one embodiment, clicking on one document library in the navigation pane produces a rendering of that library's contents in the contents pane. Clicking on a different library from a different data source refreshes the contents pane with that library's data. In another example, the side-by-side view may be simulated by opening two browser windows (e.g., one from one library and the other from another library) and tiling them side by side.

In operation, a computing device executes computer-executable instructions such as those illustrated in the figures to implement aspects of the invention.

Hardware, software, firmware, computer-executable components, computer-executable instructions, and/or the elements of the figures constitute means for providing remote read-write access to the plurality of data stores via the created object and means for mapping the data source attributes from the plurality of data sources to the object model attributes as a function of the schema maps stored in the memory area.

The following examples further illustrate aspects of the invention. In Table 1 below, the common object model for each of different user interface (UI) elements represents the data as Exchange Server Objects (XSO) from Microsoft Corporation. For example, an aggregation server such as aggregation server 106 in FIG. 1 aggregates calendar data from three disparate data sources to create an integrated or aggregated calendar view. The user interacts with the calendar view as if the displayed data were from a single data source.

TABLE 1

Exemplary Object Models and Mappings.

| UI Element | Object Model | Protocol | Data Source |
|---|---|---|---|
| Calendar Views | Calendar Objects | MAPI-RPC | Exchange Server |
| | | Exchange Web Services | Local .PST Files |
| | | Sharepoint Web Services | Sharepoint Server |
| Contact Views | Contact Objects | MAPI-RPC | Exchange Server |
| | | Exchange Web Services | Local .PST Files |
| | | Sharepoint Web Services | Sharepoint Server |
| Message Views | Message Objects | MAPI-RPC | Exchange Server |
| | | Exchange Web Services | Local .PST Files |
| Document Library Views | Document Objects | Sharepoint Web Services | Sharepoint Server |
| | | SMB for UNC access | Local File Shares |

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computerized method of an aggregation server comprising:
 connecting the aggregation server to a plurality of data sources and establishing a separate link only between the aggregation server and each one of the data sources, each said data source providing calendar attributes corresponding to personal information management (PIM) data, each of the plurality of data sources being remote from the aggregation server, said connecting further comprising:
 connecting the aggregation server to at least one mail server via a MAPI protocol; and
 connecting the aggregation server to a local client to access Personal Storage Table (pst) files stored on said local client via web services of the local client;
 accessing by the aggregation server the calendar attributes from the plurality of data sources;
 mapping by the aggregation server each of the accessed attributes to a calendar object model, said calendar object model defining a singular representation of the plurality of data sources;
 creating by the aggregation server a single object of aggregated PIM data as a function of the calendar object model;
 generating by the aggregation server user interface data representing the created object;
 sending by the aggregation server the generated user interface data to a network client of the local client for display;
 modifying by the aggregation server the created object on the aggregation server responsive to receiving a communication from the network client when a modification is performed by a user via the displayed user interface of the network client;
 identifying by the aggregation server at least one of a plurality of modified attributes of the modified object, said identifying further comprising identifying, via the calendar object model, a corresponding data source for each identified modified attribute;
 updating by the aggregation server via the separate link between the aggregation server and each identified data source wherein each data source is updated with the corresponding modified attributes in response to the user's performed modification;
 receiving a request from the network client to copy particular data from one of the plurality of data sources to another of the plurality of data sources in response to user input;
 copying the particular data from the one of the plurality of data sources to the other of the plurality of data sources via the aggregation server and responsive to receiving the request;
 updating the created object responsive to copying the particular data;
 creating updated user interface data; and
 sending the updated user interface data to the network client for display.

2. The computerized method of claim 1, wherein communicating with the network client to modify the created object comprises communicating with the network client to modify the created object responsive to a drag-and-drop operation performed by a user on the network client.

3. The computerized method of claim 1, wherein the generated user interface data represents a single view of calendar data merged from the plurality of data sources.

4. The computerized method of claim 1, wherein connecting to the plurality of data sources comprises connecting to each of the plurality of data sources via a different communication protocol.

5. The computerized method of claim 1, wherein one or more computer-readable storage media have computer-executable instructions for performing the computerized method of claim 1.

6. A computer-implemented system comprising:

a memory area storing an object model having a plurality of object model attributes corresponding to personal information management (PIM) data, said memory area further storing schema maps each being associated with at least one of a plurality of data sources providing PIM data, said data sources remote from the computer-implemented system and from each other, said plurality of data sources comprising at least one mail server and one or more personal storage table (pst) files stored on a network client, wherein each of the schema maps correlates the plurality of object model attributes to data source attributes associated with each of the data sources; and a processor configured to execute computer-executable instructions for:

connecting to the plurality of data sources;

mapping the data source attributes from the plurality of data sources to the object model attributes as a function of the schema maps stored in the memory area;

creating a mail server object of aggregated PIM data as a function of the mapped data source attributes, said created mail server object including means for providing remote read-write access to the plurality of data sources, said mail server object defining an abstracted representation of the plurality of data sources;

generating user interface data representing the created mail server object;

sending the generated user interface data to the network client for display;

modifying the created mail server object responsive to user input on the generated user interface of the network client;

identifying a set of modified object model attributes of the modified mail server object, said identifying further comprising identifying, via the object model attributes, a plurality of data source attributes and their associated data sources correlating to the modified object model attributes;

modifying at least one of the associated data sources in response to the user input;

receiving a request from the network client to copy particular data from one of the plurality of data sources to another of the plurality of data sources in response to user input;

copying the particular data from the one of the plurality of data sources to the other of the plurality of data sources and responsive to receiving the request;

updating the created object responsive to copying the particular data;

creating updated user interface data; and sending the updated user interface data to the network client for display.

7. The computer-implemented system of claim 6, wherein the network client comprises one or more of the following: a computing device, an application program, a personal digital assistant, a wireless device, a telephone, and a laptop computer.

8. The computer-implemented system of claim 6, wherein the PIM data comprises one or more of the following: calendar data, contacts data, task data, documents, and electronic mail.

9. The computer-implemented system of claim 6, wherein the generated user interface data comprises one or more of the following: hypertext markup language data, presentation data, and extensible markup language data.

10. The computer-implemented system of claim 6, wherein the generated user interface data comprises calendar data merged from a plurality of data sources.

11. The computer-implemented system of claim 6, further comprising means for mapping the data source attributes from the plurality of data sources to the object model attributes as a function of the schema maps stored in the memory area.

12. One or more computer-readable storage media having computer-executable components, said components comprising:

a network component for connecting to a plurality of data sources providing PIM data, said data sources comprising at least one web portal server and a local file share on a network client, each of said plurality of data sources remote from each other data source;

a schema component for mapping attributes from the plurality of data sources to a document object model via one or more schema maps, each of said schema maps corresponding to one of the plurality of data sources, said document object model defining an abstracted representation of the plurality of data sources;

an aggregation component for creating an object of aggregated PIM data as a function of the document object model mapped by the schema component;

a presentation component for generating user interface data representing the object created by the aggregation component, wherein the network component sends the user interface data generated by the presentation component to a network client for display; and a manipulation component for modifying the created object responsive to user input on the network client, said user input including a command to copy PIM data from a first one of the plurality of data sources to a second one of the plurality of data sources wherein the manipulation component further identifies and copies the PIM data from the first one of the plurality of the data sources to the second one of the plurality of data sources, wherein at least one of the first one of the plurality of data sources and the second one of the plurality of data sources is the web portal server.

13. The computer-readable storage media of claim 12, wherein the PIM data further comprises contacts data, and wherein the aggregation component merges contacts data from the file share with contacts data from the web portal server.

* * * * *